United States Patent [19]
Funahashi

[11] Patent Number: 5,751,229
[45] Date of Patent: May 12, 1998

[54] ANGULAR INFORMATION INPUT SYSTEM

[75] Inventor: Takahiko Funahashi, Otone-machi, Japan

[73] Assignee: WACOM Co., Ltd., Japan

[21] Appl. No.: 421,270

[22] Filed: Apr. 13, 1995

[30] Foreign Application Priority Data

Apr. 28, 1994 [JP] Japan .................... 6-111791

[51] Int. Cl.$^6$ ............................ H01H 19/00
[52] U.S. Cl. ................... 341/5; 345/173; 178/18
[58] Field of Search .................. 341/5; 178/18, 178/19; 345/173

[56] References Cited

U.S. PATENT DOCUMENTS

| | | | |
|---|---|---|---|
| 4,477,877 | 10/1984 | Nakamura et al. | 178/19 |
| 4,939,318 | 7/1990 | Watson | 178/19 |
| 5,109,225 | 4/1992 | Morita | 341/5 |
| 5,198,623 | 3/1993 | Landmeier | 178/19 |

FOREIGN PATENT DOCUMENTS

| | | | |
|---|---|---|---|
| 0388860 | 9/1990 | European Pat. Off. . | |
| 0 743 612 A1 | 11/1996 | European Pat. Off. . | |
| 03067320 | 3/1991 | Japan . | |

*Primary Examiner*—Howard L. Williams
*Attorney, Agent, or Firm*—Joseph W. Berenato, III

[57] ABSTRACT

An angular information input system detects the inclined angle of a pointing device with a high accuracy without possible errors. This system is constituted so as to detect the induction voltage distribution in each axial direction generated by sensing coils (Ci) arranged under a display screen (16) by electromagnetic wave from a tuning circuit (34) contained in a pointing device (34). This system includes calculating means for calculating normalized values vpax, vpbx, vpay, and vpby in each axial direction by using a ratio between main peak voltage (Vp) representing the pointed coordinate by the pointing device (34) and auxiliary peak voltages (Vpa, Vpb). These normalized values are function parameters for calculating the inclined angles ($-\theta x$, $\theta y$) in respective axial directions to input data representing the inclined angle $\theta$ and inclined direction of the pointing device into the associated computer.

14 Claims, 8 Drawing Sheets

ANGULAR INFORMATION INPUT SYSTEM

BACKGROUND OF THE INVENTION

1. Field of the Invention

The present invention relates generally to a coordinate data input system such as a digitizer or the like for inputting two dimensional coordinate information into various computer systems. In particular, the present invention relates to a coordinate data input system which detects inclined angle and inclined direction of a pointing device such as a stylus pen used for pointing the coordinates on a digitizer or the like.

2. Description of the Prior Art

A conventional coordinate data input deivce for two dimensional coordinate information to various computer systems is well known. In such a device, a user touches a display panel located on an input and output panel through a pointing device such as a stylus pen to input the pointed place as coordinate data into the associated computer.

Figures 7A, 7B:
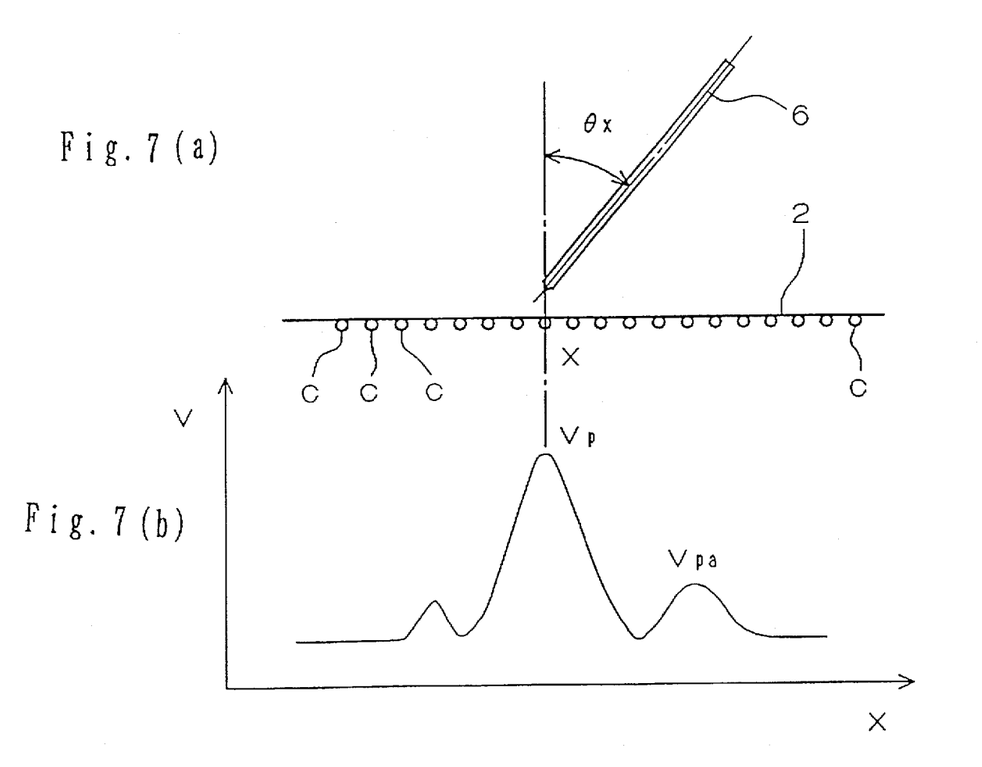
FIG. 7(a) is a schematic side view as well as FIG. 1(a), showing a stylus pen inclined and a coordinate data input device used for conventional angular information input system.
FIG. 7(b) is a graphical representation as well as FIG. 1(b), showing one example of distribution curve of induction voltage generated by sensing coils of the coordinate data input device shown in FIG. 7(a)

FIG. 7 shows such a conventional coordinate data input device, which comprises a display panel 2, a plurality of sensing coils C under the display panel 2, arranged in parallel and oriented in the same direction to define the direction of the sensing coils C in X-axial direction or Y-axial direction. A stylus pen 6 includes a tuning circuit composed of a resonant coil, capacitor(s) and so on, for tuning with electromagnetic wave generated by the sensing coils C which are energised by electric power. As a result, the tuning circuit generates induction voltage.

In a thus constituted coordinate data input device, as the pen point of the stylus pen 6 is brought into contact with the display panel 2, one of the sensing coils C is energized and then the resonant coil of the stylus pen 6 is resonated with the electromagnetic wave from the sensing coil C. In accordance with this resonance, the tuning circuit of the stylus pen 6 generates induction voltage. Then electric power supplied to the sensing coil C is cut off. Accordingly, the sensing coil C is resonated by the induction voltage remained in the tuning circuit of the stylus pen 6. As a result of this resonance, the sensing coil C generates an induction voltage whose magnitude is detected. As one continuous operation from the energizing step to the induced voltage detection on one of the sensing coils C has been completed, the same continuous operation will be repeatedly performed on another of the sensing coils C to obtain the induction voltage distribution in both X and Y axial directions. In the resulted distribution curve, the peak position of induction voltage Vp corresponds to the X coordinate pointed by the stylus pen 6.

On the other hand, computer systems may employ some angular information input devices such as a joy stick which provides input data in response to inclined angle and inclined direction of the joy stick. However, if such a joy stick is employed in addtion to the pointing device, peripheral devices for one computer system would be too many and complicated to use as a portable tool. Particularly, portable electronic information processors such as electronic notebooks, laptop computers, various terminal devices, and the like should be formed in a simple and compact shape with a multifunction and high performance peripheral device.

For this reason, the stylus pen 6 has also been provided with an angular information input function like the joy stick. For example, as pointing operation is performed by the display panel 2 and the stylus pen 6 as shown in FIG. 7, the induction voltage distributon in the X axial direction includes a main peak voltage Vp and an auxiliary peak voltage Vpa nearby the main peak. As the inclined angle θx of the stylus pen 6 is increased, it is well known that the main peak voltage Vp is decreased and contrarily the auxiliary peak voltage Vpa is increased. Thus, if the relation between the inclined angle θx of the stylus pen 6 and the value Kx=Vp/Vpa is previously obtained, then data representing the inclined angle θx in the X axial direction will be produced by detecting the Kx value.

The induction voltage distributon in the Y axial direction is also obtained in the same manner as the above, and its main peak voltage Vp and auxiliary peak voltage Vpa are employed to calculate Ky=Vp/Vpa so that the inclined angle θy in the Y axial direction is also obtained.

According to both inclined angles θx and θy, the actual inclined angle θ and inclined direction of the stylus pen 6 is provided.

Figure 8:
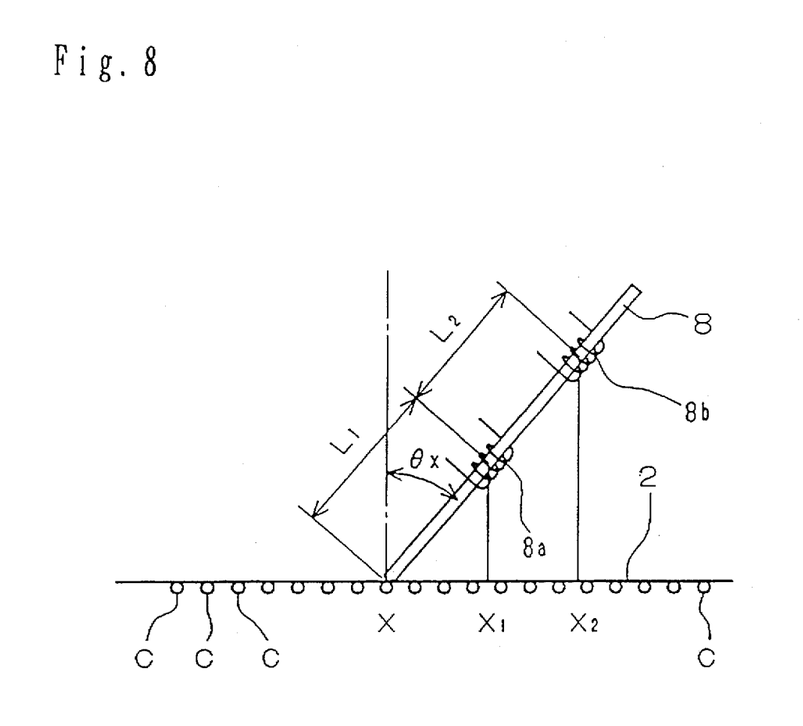
FIG. 8 is a schemtic side view showing a stylus pen containing two coils inclined and a coordinate data input device used for a conventional angular information input system.

Alternatively, FIG. 8 shows another conventional example of stylus pen 8 including two resonant coils 8a and 8b. In detail, the first and second coils 8a and 8b are arranged L1 and L2 away from the pen point, respectively. In a thus constituted stylus pen 8, for example in the X axial direction, the main peak voltage of induction voltage generated by the first coil 8a represents coordinate X1 and the main peak voltage of induction voltage generated by the second coil 8b represents coordinate X2. Thus the coordinate X of the pen point of this stylus pen 8 can be calculated by the following equation (1) according to the resulted coordinates X1 and X2 and the distance values L1 and L2.

$$X=\{(L1+L2)/L2\} \cdot X1-(L1/L2) \cdot X2 \tag{1}$$

Also, the inclined angle of the stylus pen 8 in the X axial direction can be calculated by the following equation (2) according to the resultant coordinates X and X2 and the distance values L1 and L2.

$$\theta x = \sin^{-1}(X2-X)/(L1+L2) \tag{2}$$

Also in the Y axial direction, the coordinate value Y and the inclined angle θy can be calculated according to coordinates Y1 and Y2 and the distance values L1 and L2.

According to both inclined angles θx and θy, the actual inclined angle θ and inclined direction of the stylus pen 8 is provided.

However, this conventional angular information input device has not been completely perfected in detecting accuracy. In other words, since it calculates the inclined angle θx in the X axial direction according to only the distribution of the induction voltage in the X axial direction and the inclined angle θy in the Y axial direction according to only the distribution of the induction voltage in the Y axial direction, the inclined angle in one axial direction is determined while ignoring the other angular condition. Thus such a detecting operation with this device may possibly cause errors.

The aforementioned device as shown in FIG. 7 for calculating the inclined angles θx and θy according to the values Kx and Ky which resulted from the ratio between the main peak voltage Vp and the auxiliary peak voltage Vpa may also sometimes cause misdetection. For example, when the stylus pen 6 is inclined in only the Y axial direction, the value Kx will be provided in spite of the actual inclined angle θx in the X axial direction being zero and therefore a false angle θx (≠0) will be calculated.

BRIEF SUMMARY OF THE INVENTION

It is therefore an object of the present invention to provide an improved angular information input device which detects the inclined angle of a stylus pen with a high accuracy eliminating errors.

Another object of the present invention is to provide an improved angular information input device associated with a stylus pen, adapted for a portable electronic information processor and the like.

To accomplish the above described objects, an angular information input system according to the present invention comprises a coordinate data input device for inputting two dimensional coordinate data by detecting a first distribution of induction voltage in the X axial direction and a second distribution of induction voltage in the Y axial direction; a pointing device for pointing the location on the coordinate data input device to generate the distributions of induction voltage in an electromagnetic coupling means of the coordinate data input device; and means for calculating the inclined angle in the X axial direction of the pointing device in accordance with a function of auxiliary peak value of induction voltage in the X axial direction and the inclined angle in the Y axial direction of the pointing device in accordance with a function of auxiliary peak value of induction voltage in the Y axial direction.

In the above described angular information input system, the above described calculating means is operated to calculate the inclined angle in the X axial direction of the pointing device in accordance with a function of auxiliary peak value of induction voltage in the X axial direction and auxiliary peak value of induction voltage in the Y axial direction, and to calculate the inclined angle in the Y axial direction of the pointing device in accordance with a function of auxiliary peak value of induction voltage in the X axial direction and auxiliary peak value of induction voltage in the Y axial direction, respectively.

In the above described angular information input system, the above described calculating means is operated to calculate the inclined angle in the X axial direction of the pointing device in accordance with a function of main peak value and auxiliary peak value of induction voltage in the X axial direction and main peak value and auxiliary peak value of induction voltage in the Y axial direction, and to calculate the inclined angle in the Y axial direction of the pointing device in accordance with a function of main peak value and auxiliary peak value of induction voltage in the X axial direction and main peak value and auxiliary peak value of induction voltage in the Y axial direction, respectively.

In the above described angular information input system, the above described calculating means is operated to calculate the inclined angle in the X axial direction of the pointing device in accordance with a function depending on the ratio between main peak value and auxiliary peak value of induction voltage in the X axial direction and the ratio between main peak value and auxiliary peak value of induction voltage in the Y axial direction, and to calculate the inclined angle in the Y axial direction of the pointing device in accordance with a function depending on the ratio between main peak value and auxiliary peak value of induction voltage in the X axial direction and the ratio between main peak value and auxiliary peak value of induction voltage in the Y axial direction, respectively.

In the above described angular information input system, the above described coordinate data input device comprises a plurality of sensing coils; a detecting means for detecting induction voltage generated by the sensing coils; and a calculating means for calculating the above described main peak value corresponding to the maximum voltage of the detected induction distribution and the above described auxiliary peak value corresponding to the induction voltage generated by a specific sensing coil isolated a predetermined distance away from the maximum voltage generated coil.

In the above described angular information input system, the above described pointing device is formed in a pen shape and includes a tuning circuit composed of at least one coil.

A typical operation of the angular information input system according to the present invention will be briefly described. In order to input two dimensional coordinate data, an operator indicates any required position on the coordinate data input device by means of the pointing device. In detail, a stylus pen including a tuning circuit is brought into contact with any required position on the surface plate of the coordinate data input device, and thus an induction voltage is generated between the tuning circuit of the stylus pen and the sensing coils of the coordinate data input device. Since the induction voltage generated by the sensing coil which is in contact with the stylus pen is greater than that of the other sensing coils, the maximum value of the induction voltge distribution in the axial direction; i.e., peak voltage, corresponds to the pen pointed position. Accordingly, the pointed coordinate can be detected.

When the stylus pen is inclined, as discussed before, auxiliary peak voltages will be generated at the front and/or rear position of the main peak in the induction voltage distribution in the axial direction. In order to detect the auxiliary peak voltage, one example provides the induction voltage generated by a specific sensing coil isolated a predetermined distance from the main peak voltage generated coil as the auxiliary peak voltage.

On the other hand, it is well known by one skilled artisan that the inclined angle of the stylus pen is represented by a function of the above described main peak value and/or auxiliary peak value. Since the main peak value and auxiliary peak value depends on the distance between the stylus pen and the coordinate data input device and the pressure applied to the coordinate data input device by the stylus pen, the ratio between the main peak voltage and the auxiliary peak voltage is calculated to treat the auxiliary peak voltage as a normalized voltage. In other words, the normalized voltage in the X axial direction is calculated in accordance with the ratio between the main peak voltage and auxiliary peak voltage of the induction voltage distribution in the X axial direction, and the normalized voltage in the Y axial direction is calculated in accordance with the ratio between the main peak voltage and auxiliary peak voltage of the induction voltage distribution in the Y axial direction. According to the function of the normalized voltages in the X and Y axial directions, the inclined angles of the stylus pen in the X and Y axial directions are calculated to clarify the inclined angle and direction of the stylus pen. These resultant data are input into the associated computer so that any required operation such as moving operation of cursor, scrolling operation of display screen, or the like will be performed.

These and other objects, features and advantages of the invention will become more apparent upon reading the following detailed specification and drawings.

DETAILED DESCRIPTION OF THE PREFERRED EMBODIMENT

Figure 3:
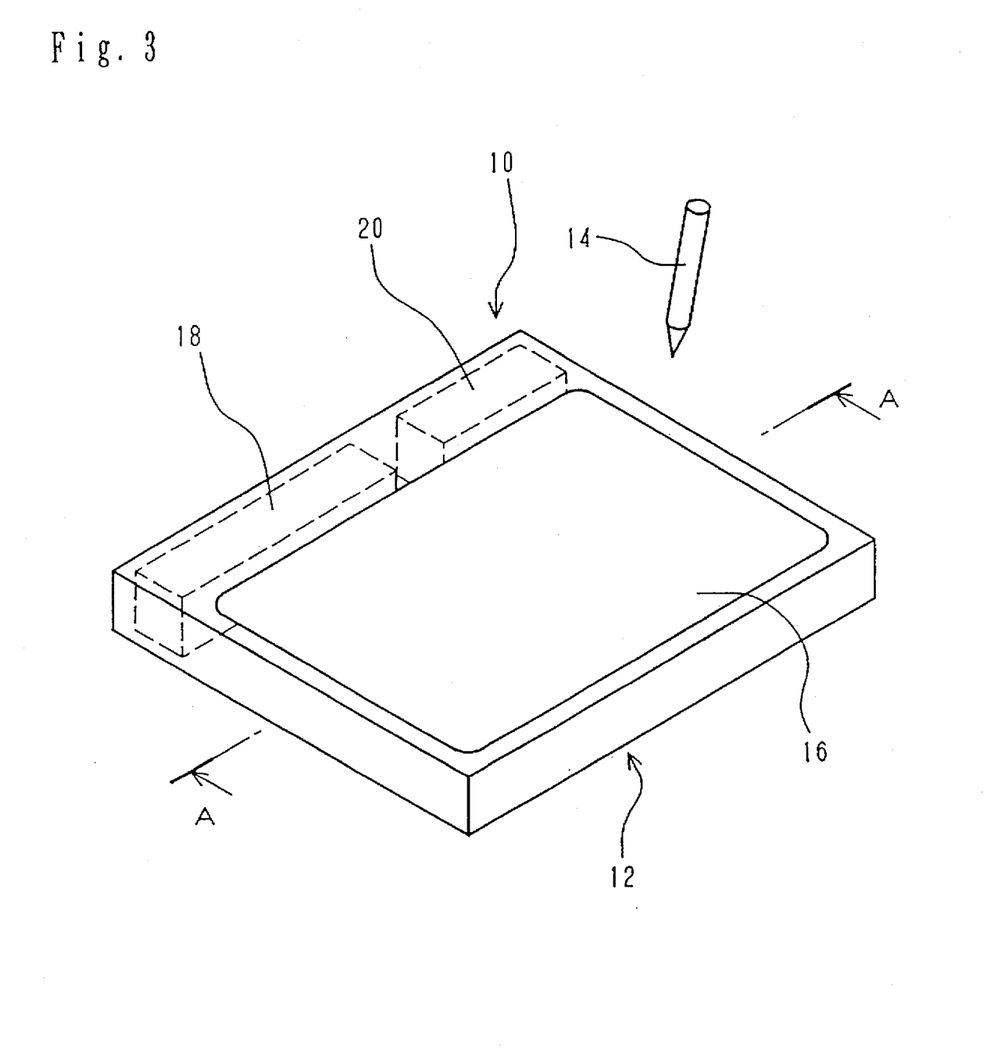
FIG. 3 is a schematic perspective showing a stylus pen and a coordinate data input device used for the angular information input system according to the present invention.
Figure 4:
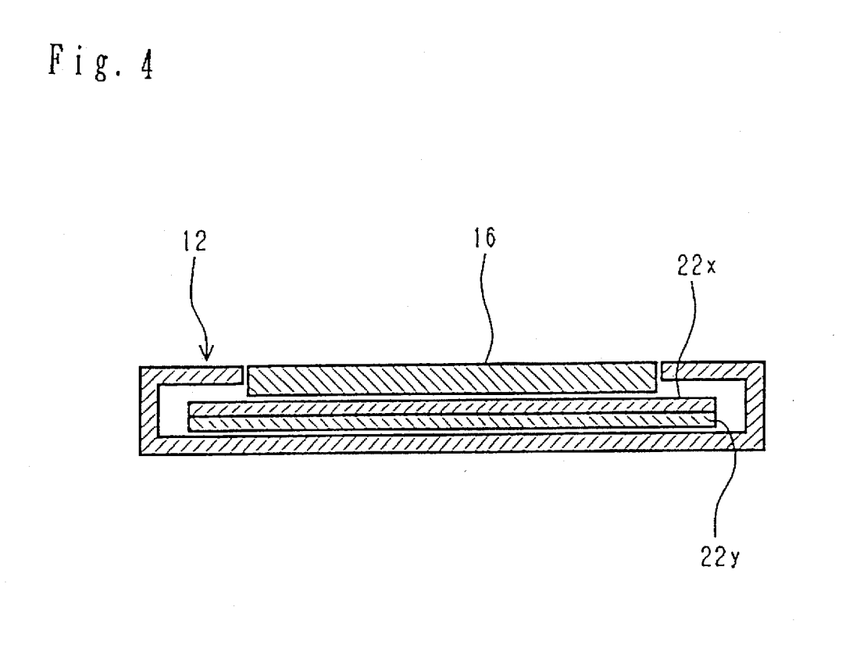
FIG. 4 is a cross sectional view taken along the line A—A shown in FIG. 3.

The present invention will be understood by discussion of some preferred embodiments in conduction with the accompanying drawings. As shown in FIG. 3, an angular information input device 10 is mainly composed of a pointing device such as a stylus pen 14 and a coordinate data input panel such as a digitizer 12. This digitizer 12 is typically formed in a substantially plane shape whose top is provided with a display panel 16 such as a liquid crystal display screen. This digitizer 12 includes a control unit 18 and a power unit 20 which are electrically connected through any suitable means in the conventional manner. As shown in FIG. 4, the digitizer 12 further includes an X axial direction detecting unit 22x and a Y axial direction detecting unit 22y which are piled under the display panel 16.

Figure 5:
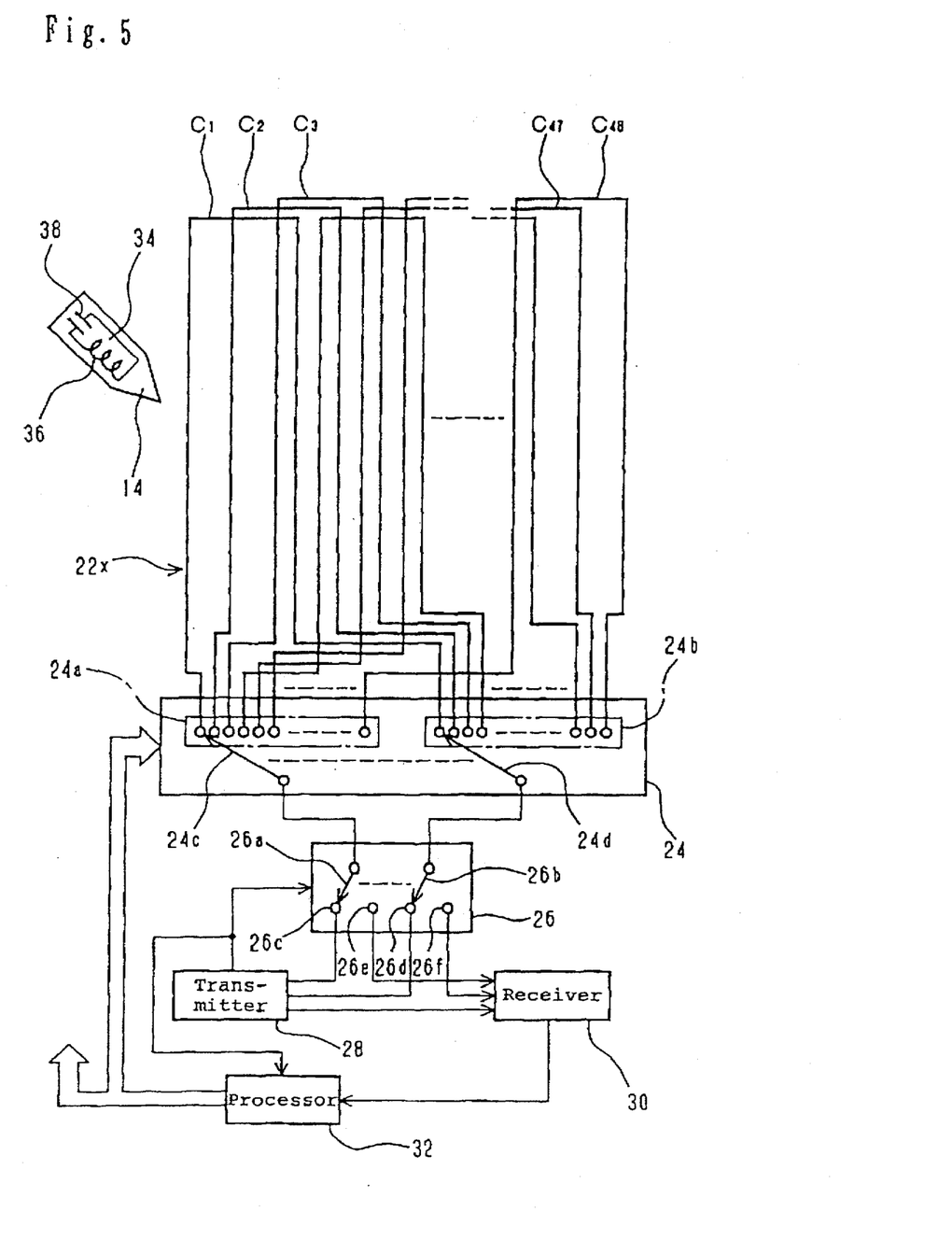
FIG. 5 is a block diagram showing the circuit structure of the coordinate data input device used for the angular information input system according to the present invention.

As shown in FIG. 5, the X axial direction detecting unit 22x includes a plurality of sensing coils C1, C2, C3, . . . , C48 (referred to "Ci") which are composed of loop conductors partially overlapped and arranged in parallel with each other in the X axial direction. The longitudinal direction of these coils is oriented in the same direction; i.e., Y axial direction. Although this embodiment shows the X axial direction detecting unit 22x including forty eight sensing coils, the present invention is not limited to this number.

One end of the sensing coil Ci is connected to a first terminal unit 24a and the other end is connected to a second terminal unit 24b. One terminal of the first terminal unit 24a is selectively connected to a first selecting terminal 24c. FIG. 5 shows the first selecting terminal 24c is connected to one end of the sensing coil C1. A second selecting terminal 24d is linked with the first selecting terminal 24c so as to connect to the other end of the sensing coil Ci. These first and second terminal units 24a and 24b, and first and second selecting terminals 24c and 24d constitute a selective circuit 24.

The first and second selecting terminals 24c and 24d are respectively connected to first and second selective contacts 26a and 26b of switching unit 26. The first and second selective contacts 26a and 26b are linked with each other so as to selectively connect transmitter terminals 26c and 26d with a transmitter 28 and receiver terminals 26e and 26f with a receiver 30. The transmitter 28 and the receiver 30 are connected to any suitable processor 32.

Figure 6:
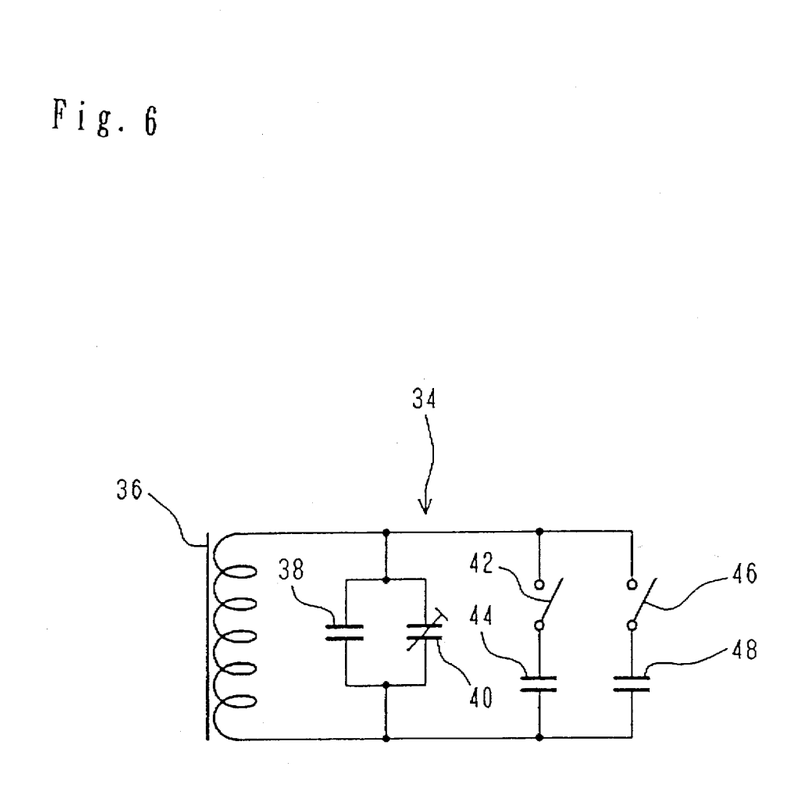
FIG. 6 is a circuit diagram showing the tuning circuit contained in the stylus pen used for the angular information input system according to the present invention.

On the other hand, the stylus pen 14 contains a tuning circuit 34, shown in FIG. 6, which is a parallel tuning circuit composed of a coil 36, a capacitor 38 and a variable capacitor 40 which are connected to both ends of the coil 36 in parallel. This tuning circuit 34 has a resonant frequency capable of tuning with the frequency generated from the sensing coil Ci when electric power is applied to the sensing coil Ci.

Both ends of the coil 36 are connected to a capacitor 44 through a first switch 42 so that the phase of electromagnetic wave for this tuning circuit 34 is delayed at a predetermined angle, for example 90° when the first switch 42 is turned on whenever, for example, the pen point of the stylus pen 14 is brought into contact with the surface of the display panel 16; i.e., pen down motion. Such pen down motion will occur when an operator puts the stylus pen 14 onto the display panel 16 to draw characters and/or illustrations.

In addition to the first switch 42 and the capacitor 44, a second switch 46 and another capacitor 48 are connected to the former pair in parallel so that the phase of electromagnetic wave for this tuning circuit 34 is delayed at a predetermined angle, for example 180° when the second switch 46 is turned on. The second switch 46 is arranged at, for example the position to which any one finger of the operator can touch while the operator is handling the stylus pen 14. In order to input any information, the operator takes predetermined action such as tilting the stylus pen 14 while pressing the second switch 46.

One typical operation to detect the pointed coordinate by using thus constituted angular information input device 10 will be described in detail.

Returning to FIG. 5, as the first and second selecting terminals 24c and 24d of the selective circuit 24 select to connect the sensing coil Ci, the first and second selective contacts 26a and 26b of the switching unit 26 also select the transmitter terminals 26c and 26d. Thus the transmitter 28 transmits a signal to allow the sensing coil Ci to generate an electromagnetic wave. Under this condition, when the stylus pen 14 is located in the vicinity of the sensing coil Ci, the generated electromagnetic wave energizes the coil 36 in the stylus pen 14 to generate induction voltage in the tuning circuit 34. Then the first and second selective contacts 26a and 26b of the switching unit 26 are switched to select the connection to the receiver terminals 26e and 26f, respectively. Thus the sensing coil Ci can not generate an electromagnetic wave, but the induction voltage remaining in the tuning circuit 34 allows the coil 36 to generate an electromagnetic wave. This generated electromagnetic wave energizes the sensing coil Ci to generate a new induction voltage. This generated induction voltage is received by the receiver 30, which passes it to the processor 32.

Successively, the first and second selecting terminals 24c and 24d of the selective circuit 24 are switched to select the next sensing coil Ci+1. Thus the same operation as the above will be repeatedly performed and the induction voltage generated by the sensing coil Ci+1 will be input to the processor 32.

Figure 2:
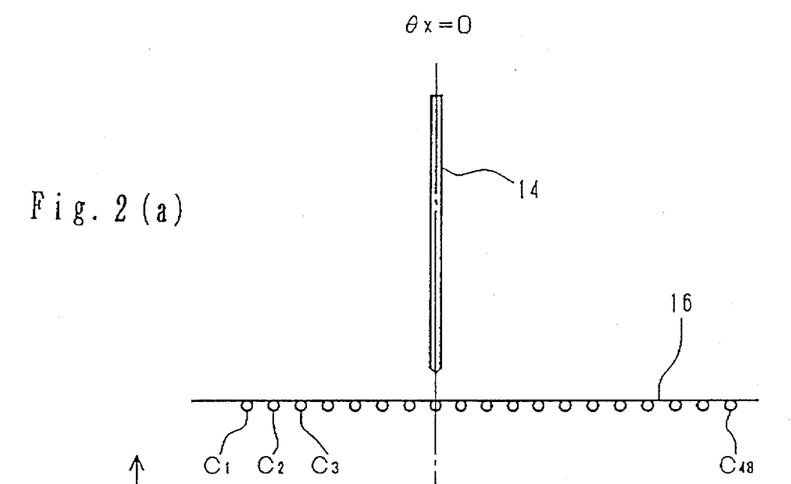
FIG. 2(a) is a schematic side view as well as FIG. 1(a), showing a stylus pen in a virtually vertical position with respect to a coordinate data input device.
FIG. 2(b) is a graphical representation as well as FIG. 1(b)

FIGS. 2(a) and 2(b) show the relationship between the position of the stylus pen 14 and the induction voltage generated by the sensing coil Ci. The sensing coil Ci closest to the stylus pen 14 has the maximum value (main peak Vp) of the induction voltage. Therefore, the processors 32 of the X and Y axial direction detecting units 22x and 22y respectively detect the main peaks Vp as the coordinate data representing the pointed place by the stylus pen 14.

When the first switch 42 of the stylus pen 14 is kept in ON position, the phase of the electromagnetic wave generated by the tuning circuit 34 is delayed at a predetermined angle, for example, 90° rather than that of the transmitter 28. Thus the processor 32 detects the delay between the phase of the electromagnetic wave transmitted from the transmitter 28 and the phase of the electromagnetic wave received by the receiver 30 to distinguish ON or OFF position of the first switch 42. According to this distinguishing operation, the pen down motion of the stylus pen 14 can be automatically detected so that the operator can easily input a variety of information such as characters and illustrations.

Next, a typical operation to detect the inclined angle θ of the stylus pen 14 by using the angular information input device 10 according to the present invention will be described in detail.

As the second switch 46 is turned on, the phase of the electromagnetic wave generated by the tuning circuit 34 is delayed at a predetermined angle, for example, 180° rather than that of the transmitter 28. Thus the processor 32 detects the delay between the phase of the electromagnetic wave transmitted from the transmitter 28 and the phase of the electromagnetic wave received by the receiver 30 to start the angular information detecting operation.

Figures 1A, 1B:
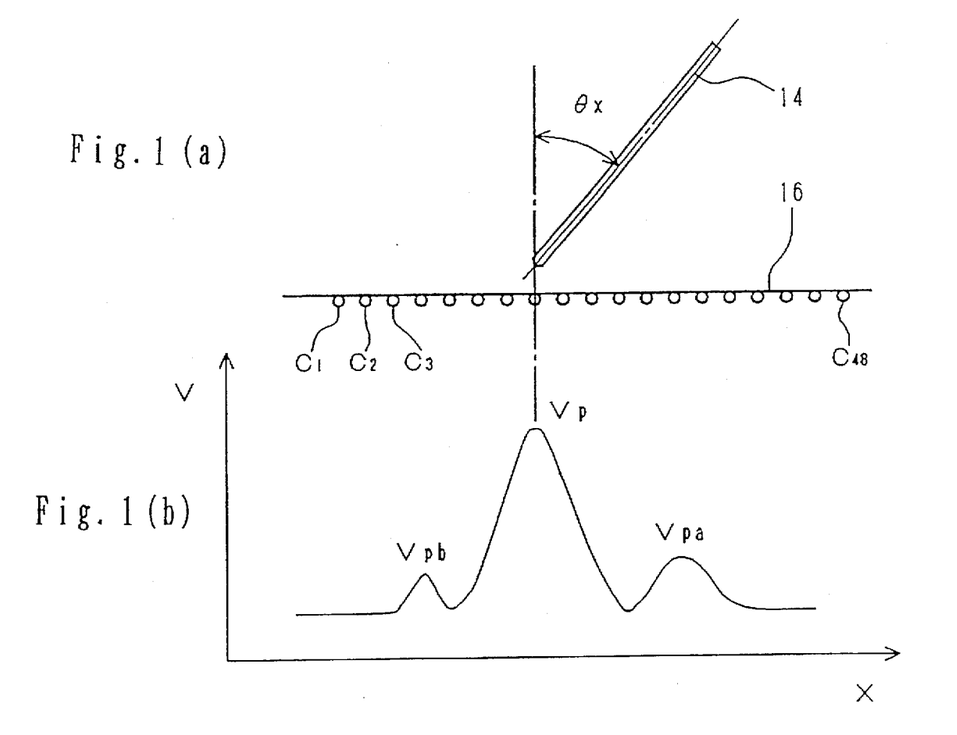
FIG. 1(a) is a schematic side view showing a stylus pen inclined and a coordinate data input device used for the angular information input system according to the present invention.
FIG. 1(b) is a graphical representation showing one example of distribution curve of induction voltage generated by sensing coils of the coordinate data input device shown in FIG. 1(a)

When the stylus pen 14 is inclined with respect to the top surface of the display panel 16 as shown in FIG. 1(a), the induction voltage distribution curve in the X axial direction, as shown in FIG. 1(b), has a main peak voltage Vp and two auxiliary peak voltages Vpa and Vpb at the front and rear of the main peak. In order to detect the auxiliary peak Vpa (Vpb), this embodiment employs the induction voltage generated by a specific sensing coil Ci+n (Ci−n) isolated a predetermined number "n" from the sensing coil Ci which generates the main peak voltage Vp.

It is well known by one skilled artisan that when the stylus pen 14 is inclined in the crosswise direction with respect to the longitudinal direction of the sensing coil Ci; i.e., X axial direction as shown in FIG. 1(a), from the vertical position as shown FIG. 2(a), the auxiliary peak voltage Vpa in the inclined side is increased and the auxiliary peak voltage Vpb in the opposite side is decreased as the inclined angle θx is increased. On the other hand, when the stylus pen 14 is inclined in the same direction of the longitudinal direction of the sensing coil Ci; i.e., Y axial direction, from the vertical position, the auxiliary peak voltages Vpa and Vpb in the X axial direction are substantially equivalent with one another regardless of the change of the inclined angle θy in the Y axial direction, but the ratio between the auxiliary peak voltage Vpa or Vpb and the main peak voltage Vp is increased as the inclined angle θy is increased.

Therefore, the inclined angle θx can be provided by using these auxiliary peak voltages Vpa and Vpb in the induction voltage in the X axial direction. However, since the auxiliary peak voltage Vpa and Vpb detected by the sensing coil Ci depend on the gap between the stylus pen 14 and the sensing coil Ci, their voltage values will be easily varied in response to a pen down motion or not, and pressure value applied to the stylus pen 14 even when the stylus pen 14 points the same coordinate position. That is, it is not desirable to calculate the inclined angles θx and θy of the stylus pen 14 by using directly the auxiliary peak voltages Vpa and Vpb.

In order to relatively normalize these auxiliary peak voltages Vpa and Vpb, the ratio between these auxiliary peak voltages and the main peak voltge Vp is calculated. For example, in the X axial direction, normalized voltages vpax and vpbx result from the ratio between the main peak voltage Vp and the auxiliary peak voltages Vpa and Vpb in the induction voltage distribution curve in the X axial direction, as shown in the following equations (3) and (4).

$$vpax = Vpa/Vp \qquad (3)$$

$$vpbx = Vpb/Vp \qquad (4)$$

Also in the Y axial direction, normalized voltages vpay and vpby result from the ratio between the main peak voltage Vp and the auxiliary peak voltages Vpa and Vpb in the induction voltage distribution curve in the Y axial direction, as shown in the following equations (5) and (6).

$$vpay = Vpa/Vp \qquad (5)$$

$$vpby = Vpb/Vp \qquad (6)$$

When the stylus pen 14 is inclined in only the X axial direction, these normalized values vpax, vpbx, vpay, and vpby will be respectively varied and thus the inclined angle θx should be calculated as the function of all normalized values vpax, vpbx, vpay, and vpby. The inclined angle θx in the X axial direction will be calculated in accordance with the normalized values vpax, vpbx, vpay, and vpby as shown in the following equations (7) to (12).

$$\beta x = vpay - vpby \qquad (7)$$

$$\gamma x = vpax - vpbx \qquad (8)$$

$$\alpha x = A - B \cdot \beta x2 - C \cdot \gamma x2 \quad (A,B,C = \text{constant}) \qquad (9)$$

$$Vpax = vpax + \alpha x \cdot rx \qquad (10)$$

$$Vpbx = vpbx - \alpha x \cdot rx \qquad (11)$$

$$Vxt = (Vpax - Vpbx)/(Vpax + Vpbx) \qquad (12)$$

In the equation (9), A, B and C are predetermined values. In the equations (10) and (11), "rx" represents an interpolating distance in each pitch of the sensing coil Ci, for example, −3.2 mm ≤ rx < 3.2 mm in pitch 6.4 mm. As will be recognized by those of skill in the art, constants A, B, and C may be determined via simulations in preliminary measurement procedures when known inclines are utilized.

The inclined angle θx is calculated in accordance with the relationship between the inclined angle θx and the above Vxt, which has been previously determined.

When the stylus pen 14 is inclined in the direction met at right angles with the longitudinal direction of the sensing coil Ci, particularly at 30° or more, the auxiliary peak voltage Vpb is lowered and thus errors may easily occur. In order to overcome this problem, when the inclined angle θx is greater than 30°, the equation (12) is preferably changed as shown in equation (13).

$$Vxt = \{(Vpax - Vpbx)/(Vpax + Vpbx)\} \cdot \{Vpax/Vpax(30)\} \qquad (13)$$

In equation (13), Vpax(30) represents the value of Vpax at the inclined angle 30°. On the other hand, when the stylus pen 14 is inclined in the counter direction, the auxiliary peak voltage Vpa is lowered. Thus equation (12) should be changed as shown in equation (14).

$$Vxt = \{(Vpax - Vpbx)/(Vpax + Vpbx)\} \cdot \{Vpbx/Vpbx(30)\} \qquad (14)$$

This equation can provide the inclined angle θy in the Y axial direction in the same manner as the above.

According to the thus resultant inclined angles θx and θy, the actual inclined angle θ and direction of the stylus pen 14 can be calculated in any suitable manner as known in the prior art. Then the calculated data is input to the associated computer via the processor 32 so that the stylus pen 14 can be operated as well as a joystick to move a cursor.

Since the angular information input device 10 provided as an embodiment of the present invention will enact its compensating system whenever each or both inclined angles θx and θy exceeds a predetermined value for example 30°, the inclined angles θx and θy will be accurately detected, eliminating the possible errors caused by lowering at least one of the auxiliary peak voltages.

As explained above, the angular information input system according to the present invention provides the inclined angle of the pointing device in the X and Y axial directions by calculating the function of the auxiliary peak voltages in both axial directions. This means the inclined angle in one axial direction is calculated as the fuction of both auxiliary peak voltages in both directions. Therefore, this system ensures that the inclined angle of the pointing device can be accurately detected rather than conventional inclined angle detecting systems based on only the induction voltage distribution in the inclined direction.

Alternatively, the angular information input system according to the present invention may calculate both inclined angles of the pointing device in both X and Y axial directions by using the normalized values resulting from the function of the ratio between the main peak voltage and the auxiliary peak voltage in the X axial direction and the ratio between the main peak voltage and the auxiliary peak voltage in the Y axial direction. This system ensures the calculated inclined angle of the pointing device is free from the change of the distance between the pointing device and the coordinate data input device. In other words, the inclined angle can be correctly detected even when the auxiliary peak voltage is changed in accordance with vertical movement of the pointing device inclined at a constant angle.

Furthermore, the angular information input system according to the present invention may detect the auxiliary peak voltage by measuring the induction voltage generated by the specific sensing coil isolated a predetermined distance away from the sensing coil generating the main peak voltage. This system ensures the auxiliary peak voltage can be easily calculated and the inclined angle of the pointing device can be detected more accurately.

For example, when the inclined angle of the pointing device is only detected at the specific position on the coordinate data input device and the pen point contacting position is limited, the sensing coil generating the auxiliary peak voltage can be limited. Thus the auxiliary peak voltage can be easily and quickly detected by measuring only the limited coil. This system can reduce detection time and simplify the detecting constitution.

The angular information input system according to the present invention may employ a conventional pointing device and coordinate data input device, thereby saving cost. Furthermore, this system does not need to increase the number of times for sampling the sensing coils, therefore the operator can perform input operation smoothly in the same manner as is conventionally done.

As many apparently widely differing embodiments of this invention may be made without departing from the spirit and scope thereof, it is to be understood that the invention is not limited to the specific embodiments thereof except as defined in the appended claims.

What is claimed is:

1. An angular information input system for determining coordinate data and tilt data relating to an inclined angle of a pointing device relative to a coordinate data input device, the angular information input system comprising:

said coordinate data input device, including a plurality of parallel conductors in each of the X and Y axial directions, for inputting coordinate data by detecting electromagnetic signals from said pointing device in each of the X axial direction and the Y axial direction;

said pointing device for indicating location on said coordinate data input device by way of the electromagnetic signals detected via said conductors; and a calculating means for calculating the incline angle of said pointing device relative to said coordinate data input device in the X axial direction as a function of main peak and auxiliary peak signals detected in each of the X axial direction and the Y axial direction.

2. The angular information input system as set forth in claim 1, wherein the above described calculating means is operated to calculate the inclined angle in the X axial direction of the pointing device in accordance with a function of main peak value and auxiliary peak value of induction voltage in the X axial direction and main peak value and auxiliary peak value of induction voltage in the Y axial direction, and to calculate the inclined angle in the Y axial direction of the pointing device in accordance with a function of main peak value and auxiliary peak value of induction voltage in the X axial direction and main peak value and auxiliary peak value of induction voltage in the Y axial direction, respectively.

3. The angular information input system as set forth in claim 1, wherein the above described calculating means is operated to calculate the inclined angle in the X axial direction of the pointing device in accordance with a function depending on the ratio between main peak value and auxiliary peak value of induction voltage in the X axial direction and the ratio between main peak value and auxiliary peak value of induction voltage in the Y axial direction, and to calculate the inclined angle in the Y axial direction of the pointing device in accordance with a function depending on the ratio between main peak value and auxiliary peak value of induction voltage in the X axial direction and the ratio between main peak value and auxiliary peak value of induction voltage in the Y axial direction, respectively.

4. The angular information input system as set forth in claim 1, wherein the above described coordinate data input device comprises a plurality of sensing coils; a detecting means for detecting induction voltage generated by the sensing coils; and a calculating means for calculating the above described main peak value and auxiliary peak from the detected induction distribution.

5. The angular information input system as set forth in claim 4, wherein the above described calculating means calculates the main peak value corresponding to the maximum voltage of the detected induction distribution and the auxiliary peak value corresponding to the induction voltage generated by a specific sensing coil isolated a predetermined distance from the maximum voltage generated coil.

6. The angular information input system of claim 1, wherein said calculating means further includes means for determining said inclined angle in the X axial direction using normalized values resulting from a ratio between a main peak signal and said auxiliary peak signals detected in each of the X axial direction and the Y axial direction.

7. The angular information input system of claim 6, further including means for compensating for the possibility of error at incline angles greater than a predetermined degree by adjusting said calculating means for calculations of incline angles greater than said predetermined degree.

8. The angular information input system of claim 1, wherein said calculating means further includes means for calculating the incline angle of said pointing device relative to said coordinate data input device in the Y axial direction as a function of auxiliary peak signals detected in each of the X axial direction and the Y axial direction.

9. The angular information input system of claim 8, wherein said calculating means further includes means for calculating the incline angles of said pointing device in the X axial direction as a function of main peak signals detected in each of the X and Y axial directions.

10. The angular information input system of claim 1, wherein said pointing device is a stylus and said coordinate data input device is a digitizer tablet.

11. The angular information input system of claim 1 further including means for using said pointing device in the manner of a joystick in order to move the location of a cursor.

12. The angular information input system of claim 11, wherein said pointing device is a stylus, and said stylus includes switching means, which when actuated, is for enabling said stylus to act in a joystick-like manner when tilted in order to move the location of a cursor on a corresponding computer.

13. The angular information input system of claim 1, wherein said pointing device is a stylus and includes a tuning circuit for coupling electromagnetic signals between said coordinate data input device and said pointing device.

14. An angular information input system for determining coordinate data and tilt data relating to an inclined angle of a pointing device relative to a digitizer tablet, the angular information input system comprising:

said digitizer tablet, including a plurality of parallel conductors aligned in at least one axial direction, for inputting coordinate data in X and Y axial directions by detecting electromagnetic signals from said pointing device;

said pointing device for indicating location on said digitizer tablet by way of electromagnetic signals output from said pointing device that are received by said conductors of said digitizer; and calculation means for calculating the incline angle of said pointing device relative to a surface of said digitizer tablet in each of the X and Y axial directions as a function of normalized values resulting from a function of a ratio between main and auxiliary peak voltages, thereby reducing susceptibility to error in determining incline angle when said pointing device is vertically moved relative to said tablet.

* * * * *